United States Patent [19]

Chowdhury et al.

[11] 4,354,624
[45] Oct. 19, 1982

[54] SLURRY SPREADER WITH METERING VALVES

[75] Inventors: Mofazzal H. Chowdhury; John W. Bliss, both of Vinton, Iowa

[73] Assignee: Farmhand, Inc., Hopkins, Minn.

[21] Appl. No.: 173,325

[22] Filed: Jul. 29, 1980

[51] Int. Cl.³ .............................................. A01G 25/09
[52] U.S. Cl. .................................. 222/608; 222/330; 138/45; 239/76; 239/159
[58] Field of Search ....................... 137/844, 845, 849; 138/45, 46; 222/49.0, 608, 330; 239/533.1, 533.14, 570, 571, 76, 159

[56] References Cited

U.S. PATENT DOCUMENTS

| | | | |
|---|---|---|---|
| 1,843,759 | 2/1932 | Chipman | 239/127 |
| 2,593,315 | 4/1952 | Kraft | 138/45 |
| 3,241,726 | 3/1966 | Chester | 222/490 |
| 4,056,226 | 11/1977 | Hodgson | 239/172 |

FOREIGN PATENT DOCUMENTS

W15331X  6/1956  Fed. Rep. of Germany ...... 137/845

Primary Examiner—Robert J. Spar
Assistant Examiner—Frederick R. Handren
Attorney, Agent, or Firm—Wegner, McCord, Wood & Dalton

[57] ABSTRACT

An apparatus for injecting slurry in a field has a wheeled slurry tank, a feed conduit communicating with the interior of the tank, a transverse manifold to receive slurry from the feed conduit, several slurry injector pipes spaced along the conduit, and either a slurry pump or air pressurizing means for moving slurry from the tank under pressure for discharge through the feed conduit, the manifold, and the injector pipes. In all the slurry injector pipes are identical flow controlling and equalizing elements which have a single orifice and which are formed of elastomeric material which can flex to facilitate passing solid debris through the orifice. The orifice size provides a positive pressure head in the manifold so all the pipes deliver substantially equal quantities of slurry per unit time under varying conditions of operation.

9 Claims, 11 Drawing Figures

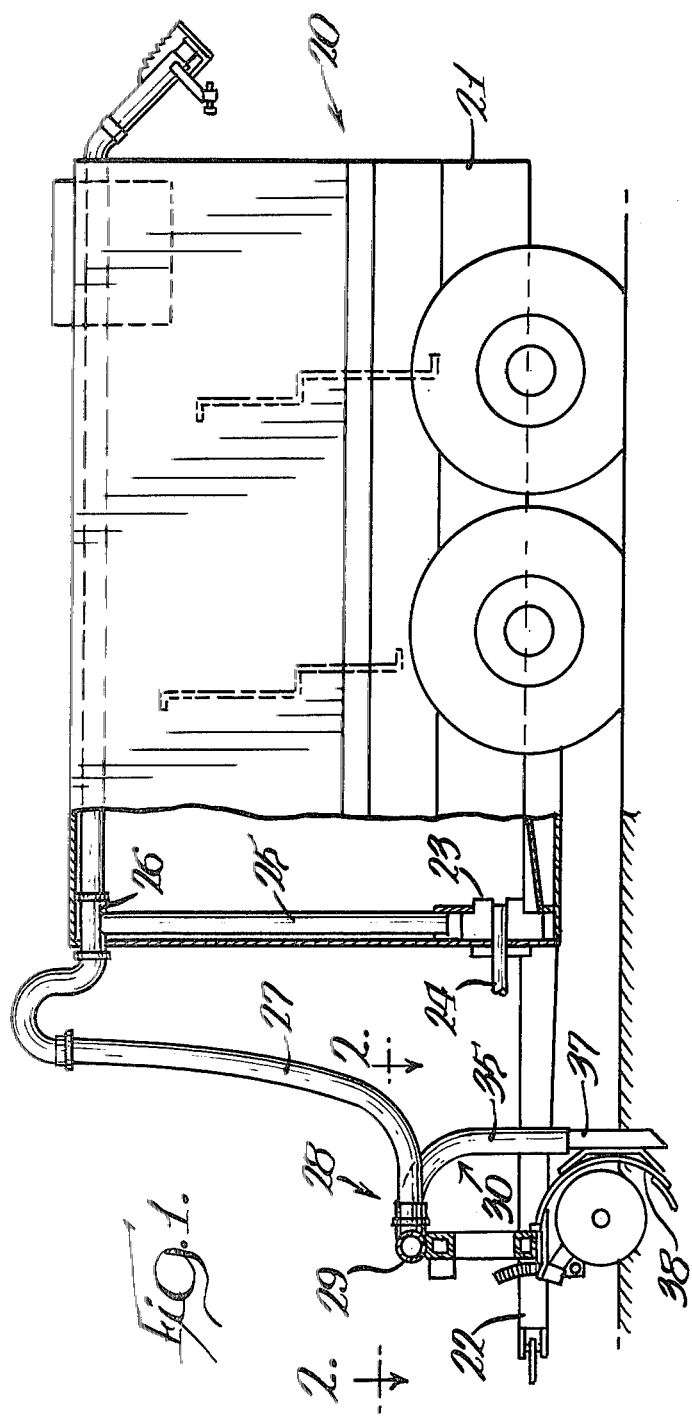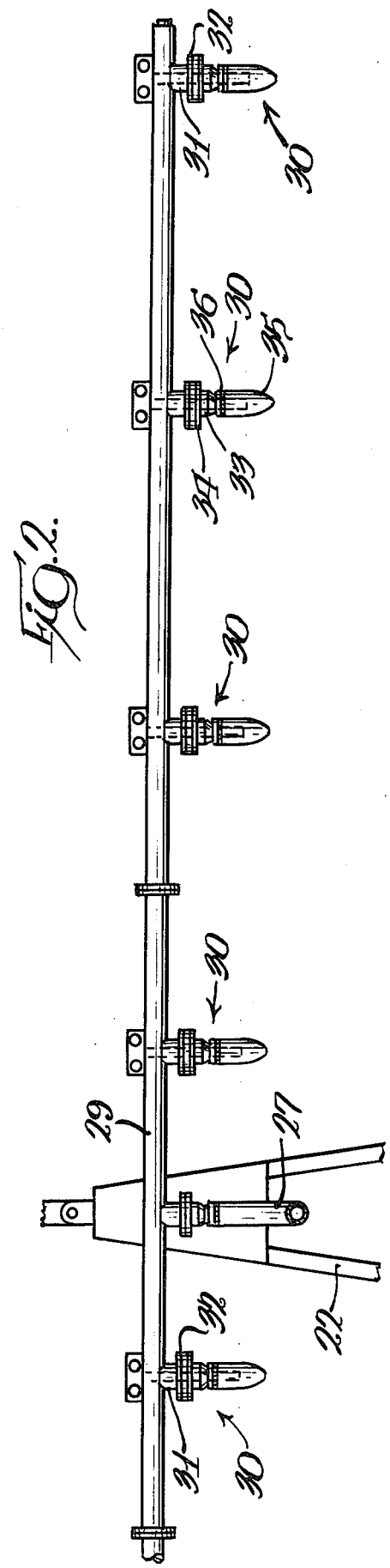

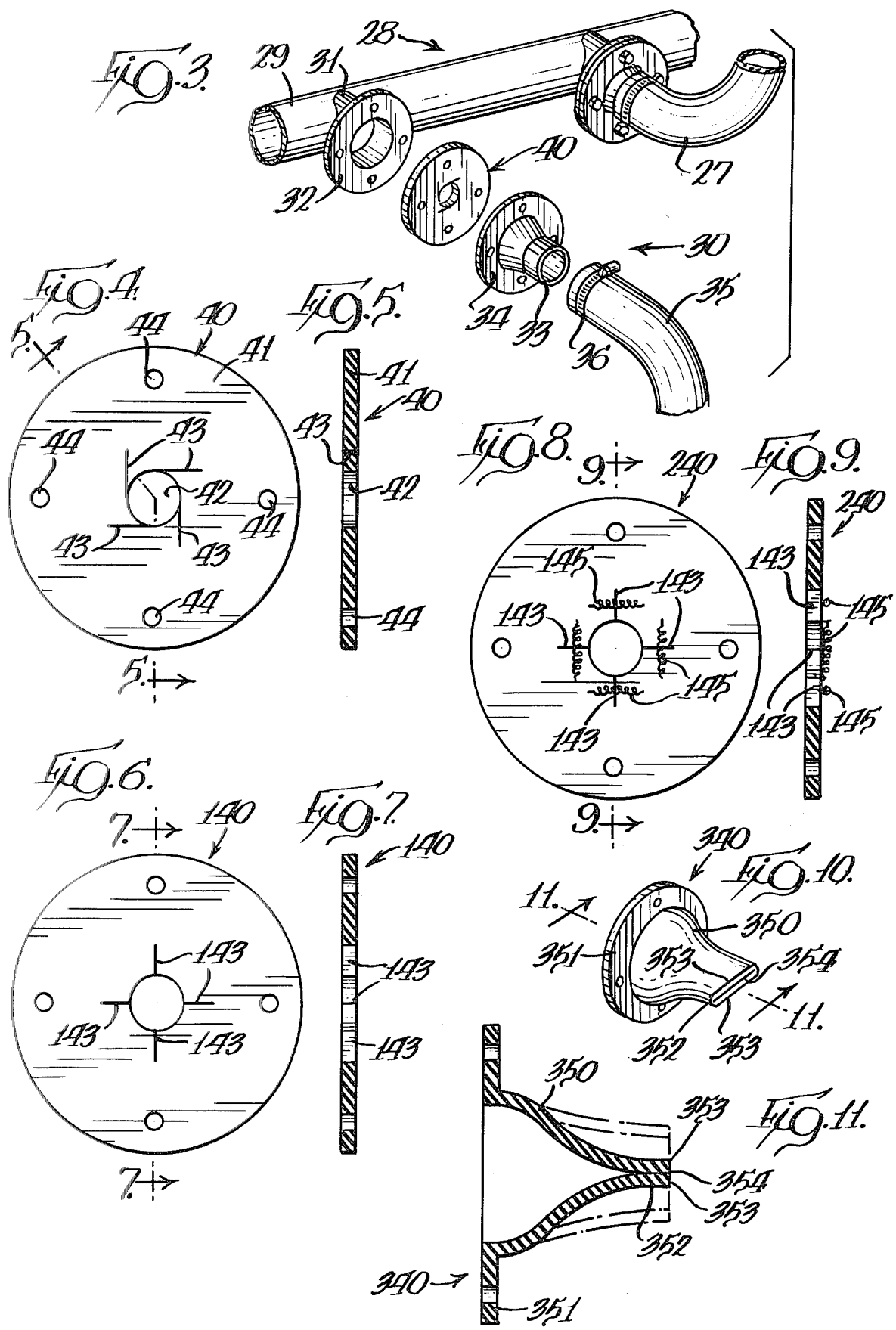

SLURRY SPREADER WITH METERING VALVES

BACKGROUND OF THE INVENTION

The present invention constitutes an improvement upon apparatus of the general type disclosed in Hodgson U.S. Pat. No. 4,056,226, issued Nov. 1, 1977. In particular, the improvement relates to slurry injecting apparatus which utilizes a slurry pump as in said patent, or a tank provided with air pressurizing means instead of a slurry pump.

A practical problem with slurry injectors of the type illustrated in U.S. Pat. No. 4,056,226 is that the several slurry delivery pipes which receive slurry from the wheeled tank through a common transverse manifold do not all deliver the same quantity of material per unit time under varying conditions of operation. The problem is rooted in the type of material that is handled in such slurry injectors. Most frequently the material is a blend of livestock manure and urine removed from animal holding areas, sometimes mixed with additional water and stored in large holding tanks with agitators to prevent fine solids from settling to the bottom of the tank as a sludge. The way in which such material is collected invariably causes it to include large debris such as pebbles, clods, sticks, and the like.

The injector pipes must be large enough that they will not become clogged with debris, and in practice it has been necessary to use injector pipes which are large enough that they cannot maintain a positive pressure head in the manifold. The slurry runs freely through the injector pipes into the ground. As a result, when the apparatus is operating on a sidehill so that one end of the manifold is lower than the other, the injector pipes toward the lower end of the manifold receive and deliver substantially more slurry than do the pipes toward the upper end of the manifold.

A slurry injector is intended to deliver moderate amounts of slurry to all the furrows in which the injector pipes operate, but it is entirely possible in sidehill operation to overflow the furrow or furrows toward the downhill side while providing little or no slurry to the furrows on the uphill side. Excessive concentration of the high nitrogen slurry can produce crop damage of one kind, while lack of sufficient slurry can produce another kind of crop damage.

SUMMARY OF THE INVENTION

In accordance with the present invention, all the slurry injector pipes are provided with identical flow controlling and equalizing elements which have an orifice and are formed of elastomeric material which can flex to facilitate passing solid debris through the orifice. The orifice size is small enough to maintain a positive head in the manifold at the pressure provided by the slurry discharge means, so all the pipes deliver substantially equal quantities of slurry per unit time under varying conditions of operation.

In the most preferred form of the invention, the flow controlling and equalizing elements are removable inserts in the injector pipes consisting of discs of flexible elastomeric material having a single orifice of predetermined diameter, and a plurality of slits tangent to the orifice.

THE DRAWINGS

FIG. 1 is a side elevational view, partly in section, of a device which has a slurry injector with which the present invention is utilized, and also a slurry spreader.

FIG. 2 is a fragmentary sectional view on an enlarged scale, taken substantially as indicated along the line 2—2 of FIG. 1;

FIG. 3 is a fragmentary perspective view of the slurry injector of FIGS. 1 and 2, with the parts directly related to the present invention illustrated as an exploded view, and showing the preferred form of the invention;

FIG. 4 is a front elevational view of the removable flow restricting disc illustrated in FIG. 3;

FIG. 5 is a sectional view taken substantially as indicated along the line 5—5 of FIG. 4;

FIG. 6 is a front elevational view of a first alternative form of a removable disc;

FIG. 7 is a sectional view taken substantially as indicated along the line 7—7 of FIG. 6;

FIG. 8 is a front elevational view of a second alternative embodiment of a removable disc;

FIG. 9 is a sectional view taken substantially as indicated along the line 9—9 of FIG. 8;

FIG. 10 is a perspective view of a third alternative embodiment of a flow controlling and equalizing device; and FIG. 11 is a sectional view on an enlarged scale taken substantially as indicated along the line 11—11 of FIG. 10, and illustrates the device in broken lines expanded to permit a stone or clod to pass through it.

DETAILED DESCRIPTION OF THE INVENTION

Referring to the drawings in detail, the type of apparatus to which the invention is shown as being applied is the same as that disclosed in U.S. Pat. No. 4,056,266; and only those parts of the apparatus which are necessary for an understanding of the present invention will be described in detail.

A slurry injecting or spreading apparatus, indicated generally at 20, includes a wheeled slurry tank 21 provided with a drawbar 22 by means of which it may be moved about a field by a farm tractor. At the front of the tank, near the bottom, is a combined impeller and agitator pump 23 having a shaft 24 by means of which it may be driven from a tractor power takeoff.

A discharge pipe 25 connected through a T 26 with a feed conduit 27 of a slurry injector, indicated generally at 28, which is carried upon the three point hitch (not shown) of the tractor.

The slurry injector 28 includes a transverse manifold 29 which carries eight slurry injector pipes, five of which are illustrated in FIG. 2 and indicated generally by the reference numeral 30.

The term "slurry injector pipe" is here used to apply to an entire assembly which is best seen in FIG. 3 to include a hollow boss 31 on the manifold which is provided with an external flange 32, a fitting 33 having an external flange 34, a hose 35 which is secured to the fitting 33 by means of a clamp 36, and an injector tube 37 which is welded to the rear of a chisel 38. In slurry injectors as made prior to the present invention, a rubber gasket was inserted between the flanges 32 and 34 when the fitting 33 was mounted upon the hollow boss 31.

In accordance with the present invention, a flow controlling and equalizing element, the preferred embodiment of which is indicated generally at 40, is inserted between the flanges 32 and 34 in place of the gasket. As best seen in FIGS. 4 and 5, the preferred flow controlling element 40 consists of a thin disc 41 of elastomeric material provided with an orifice consisting of a single center opening 42, and four slits 43 which are tangent to the opening at points spaced 90° from one another. The disc has mounting holes 44 which register with holes in the flanges 32 and 34 for fixing the disc between the flanges.

A successfully tested prototype of the preferred flow controlling element 40 has the following dimensions:
outside diameter 7.75" (196.85 mm)
bolt circle through centers of holes 44, 6.30" (160.02 mm)
opening diameter 1.50" (38.1 mm)
diameter circumscribing ends of slits 43, 3" (76.2 mm)
thickness 0.31" (7.874 mm)

The material specifications for the discs 41 are as follows:
durometer, 60±5
material, synthetic butyl rubber, RMA Grade II
two-ply nylon carcass sheathed on one side with 0.12" (3.048 mm), and on the other side with 0.03" (0.762 mm) of SBR rubber, RMA Grade II.

In practice, the discs 41 may be punched from standard rubber conveyor belt meeting the above specifications, which is available from many suppliers.

In a commercial slurry spreader in which the prototypes of the flow controlling elements 40 were tested, the hoses 35 are 3" (76.2 mm) ID; and the injector tubes 37 are thin-walled metal which fits snugly in the hoses 35. Operating pressure in the feed conduit 27 is generally from 10 to 12 psi (0.692 to 0.830 kg/sq. cm).

Referring now to FIGS. 6 and 7, a first alternative embodiment 140 of the flow equalizing element is substantially identical with the embodiment 40, except that instead of having tangential slits 43, the disc is provided with radial slits 143.

A second alternative embodiment 240 of the flow controlling element is like the first alternative embodiment in that it has radial slits 143; but in addition it has tension springs 145 connected across the slits. Where tension springs are used, the material of the discs may be softer.

In the third alternative embodiment 340 of a flow equalizing element, a sleeve 350 is provided with an external mounting flange 351 to lie between the flanges 32 and 34, and the other end 352 of the sleeve is shaped to provide wide, substantially contacting lips 353 which define an orifice in the form of a thin flexible opening 354. The lips 353 may open to the shape illustrated in broken lines in FIG. 11 to permit passage of debris.

The foregoing detailed description has been given for clearness of understanding only and no unnecessary limitations should be understood therefrom as modifications will be obvious to those skilled in the art.

We claim:

1. In an apparatus of the type which has a wheeled slurry tank adapted to be moved over a field, a feed conduit communicating with the interior of the tank, a transverse manifold to receive slurry from said feed conduit, several slurry injector pipes which are spaced along said conduit and have open ends through which slurry is discharged onto the field, and means for moving slurry from said tank under pressure for discharge through the feed conduit, the manifold, and the injector pipes, the improvement comprising:
a flow controlling and equalizing element in each slurry injector pipe between the manifold and the open end of the pipe, each of said elements having an orifice and being formed of elastomeric material which can flex to facilitate passing solid debris through said orifice, said orifices being small enough to produce a positive pressure head in the manifold, and all of said elements being effectively identical so as to maintain substantially the same pressure drop across each one of said injector pipes, whereby all said pipes deliver substantially equal quantities of slurry per unit time under varying conditions of operation.

2. The improvement of claim 1 in which the identical elements are removable inserts in the injector pipes.

3. The improvement of claim 2 in which each insert is a disc the thickness of which permits it to flex freely.

4. The improvement of claim 3 in which the orifice in each insert comprises an opening and a plurality of slits communicating with and spaced about the perimeter of the opening.

5. The improvement of claim 4 in which the slits are tangent to the opening.

6. The improvement of claim 4 in which the slits extend radially from the opening.

7. The improvement of claim 6 which includes a tension spring across each slit.

8. The improvement of claim 2 in which each insert is a sleeve which has one of its ends secured in the injector pipe and the other of its ends inside the pipe and shaped to provide an orifice in the form of a wide, thin flexible opening with substantially contacting lips.

9. The improvement of each one of claims 2 to 8 in which each injector pipe comprises a hollow outlet boss on the manifold provided with an external flange and a length of pipe provided with external flange means adapted to be bolted to the outlet boss flange, and in which each removable insert has its periphery clamped between said flange and said flange means.

* * * * *